United States Patent
Kuo et al.

(10) Patent No.: US 9,459,742 B2
(45) Date of Patent: Oct. 4, 2016

(54) METHOD FOR DESIGNING PATTERN OF SENSING CHANNELS IN TOUCH PANEL

(71) Applicant: MStar Semiconductor, Inc., Hsinchu Hsien (TW)

(72) Inventors: Wei-Lun Kuo, Hsinchu (TW); Chao-Cheng Wen, Zhunan Township (TW); Meng-Che Tsai, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 89 days.

(21) Appl. No.: 14/340,674

(22) Filed: Jul. 25, 2014

(65) Prior Publication Data

US 2015/0029147 A1    Jan. 29, 2015

(30) Foreign Application Priority Data

Jul. 25, 2013    (TW) .............................. 102126719 A

(51) Int. Cl.
| | |
|---|---|
| *G06F 3/045* | (2006.01) |
| *G06F 3/044* | (2006.01) |
| *G06F 3/041* | (2006.01) |
| *G06F 3/03* | (2006.01) |

(52) U.S. Cl.
CPC ............. *G06F 3/044* (2013.01); *G06F 3/0412* (2013.01); *G06F 3/0317* (2013.01)

(58) Field of Classification Search
CPC ...... G06F 3/041; G06F 3/0412; G06F 3/044; G06F 3/045; G06F 3/0317; G06F 3/0321
USPC .................................................. 345/173–178
See application file for complete search history.

(56) References Cited

U.S. PATENT DOCUMENTS

2012/0267228 A1* 10/2012 Hong et al. .................. 200/600
2014/0347299 A1* 11/2014 Lu et al. ....................... 345/173

* cited by examiner

*Primary Examiner* — Vijay Shankar
(74) *Attorney, Agent, or Firm* — Edell, Shapiro & Finnan, LLC

(57) ABSTRACT

A method for designing a pattern of sensing channels is provided. The method is applied to a touch panel including a plurality of electrodes and a plurality of sections of sensing channels. The electrodes are connected to a plurality of sensors for the touch panel via the sections of sensing channels. According to a minimum sensing channel width, a minimum sensing channel gap, a maximum distribution width and lengths of the sections of sensing channels, a set of rules are established. According to the set of rules, a programming process is utilized to determine respective widths of the sections of sensing channels.

13 Claims, 3 Drawing Sheets

METHOD FOR DESIGNING PATTERN OF SENSING CHANNELS IN TOUCH PANEL

This application claims the benefit of Taiwan application Serial No. 102126719, filed Jul. 25, 2013, the subject matter of which is incorporated herein by reference.

BACKGROUND OF THE INVENTION

1. Field of the Invention

The invention relates in general to a touch control system, and more particularly, to a pattern of sensing channels for connecting sensors and electrodes in a touch control system.

2. Description of the Related Art

Operating interfaces of recent electronic products have become increasingly user-friendly and intuitive with the progressing technology. For example, through a touch screen, a user can directly interact with applications and input messages/texts/patterns with fingers or a stylus, thus eliminating complexities associated with other input devices such as a keyboard or buttons. In practice, a touch screen usually comprises a touch panel and a display disposed at the back of the touch panel. According to a touch position on the touch panel and a currently displayed image on the display, an electronic device determines an intention of the touch to execute corresponding operations.

FIG. 1 shows a diagram of a configuration of electrodes/sensing channels of a self-capacitive touch panel. In a sensing region 100 marked by a dotted frame, a plurality of electrodes (e.g., electrodes 11A and 11B) having planar contours similar to right triangles are disposed. Each of the electrodes is connected to a sensing circuit (sensors 14A and 14B are depicted as representatives) on a flexible printed circuit board (FPC) 13 via a sensing channel (e.g., a sensing channel 12A or 12B). When the user touches the electrode 11A, for example, via the sensing channel 12A, a capacitance detected by the sensor 14A corresponding to the electrode 11A is changed. Accordingly, a subsequent circuit can determine that the user touch occurs at a position of the electrode 11A.

Ideally, it is preferred that resistances of the sensing channels toward the sensors are substantially equal. Thus, differences in time periods required for charging/discharging the sensors can be reduced to further lower inconsistencies in sensing results caused by circuit mismatch. However, as seen from FIG. 1, lengths of routes connecting the electrodes to the corresponding sensors are different. For example, the length of the sensing channel 12B connecting the electrode 11B is far greater than the length of the sensing channel 12A connecting the electrode 11A. As is well-known by people skilled in the art, the resistance is directly proportional to the length of the sensing channel. The resistance that the sensing channel 12B forms on the sensor 14B is apparently several times of the resistance that the sensing channel 12A forms on the sensor 14A. Such non-ideal characteristic may lead a subsequent controller to misjudge an intention of the user touch and thus trigger an erroneous operation result.

To minimize an average resistance difference of the sensing channels, a conventional solution usually adopts metal as the sensing channels to reduce an absolute difference between a maximum resistance value and a minimum resistance value. In the meanwhile, due to transparency requirements, the electrodes are mostly made of transparent indium tin oxide (ITO) rather than metal. It is understandable that, compared to one single material, production costs simultaneously involving two materials, such as metal and ITO, are higher. Further, metal is not a transparent material. In order to cover metal wires arranged around peripheries of electrodes, outer edges of a touch panel are forced to be a dark frame, which limits design flexibilities in the product appearance.

SUMMARY OF THE INVENTION

The invention is directed a method for designing a pattern of sensing channels. Through a programming process, the method of the present invention is capable of minimizing an average resistance difference of multiple sections of sensing channels, i.e., rendering multiple sections of sensing channels having different lengths to have substantially the same resistance. Based on such feature of the present invention, a material such as ITO having a higher unit resistance value may also be utilized as a material for sensing channels in a touch panel, thereby significantly lowering production costs of the touch sensing panel. Further, ITO is substantially a transparent material, and therefore outer edges of a touch panel implementing the method of the present invention need not adopt a frame for covering the sensing channels.

According to an embodiment of the present invention, a method for designing a pattern of sensing channels is provided. The method is applied to a touch panel including a plurality of electrodes and a plurality of sensing channels, each includes at least one section. The electrodes are connected to a plurality of sensors for the touch panel via the sensing channels. In the method, according to a minimum sensing channel width, a minimum sensing channel gap, a maximum distribution width and lengths of the sections of sensing channels, a set of rules are established. According to the set of rules, a programming process is utilized to determine respective widths of the sections of sensing channels.

According to another embodiment of the present invention, a non-transitory computer-readable storage medium is provided. The storage medium stores a program code readable and executable by a processor. The program code is for designing a plurality of sections of sensing channels in a touch panel. The touch panel further includes a plurality of electrodes. The electrodes are connected to a plurality of sensors for the touch panel. When the program code is executed by the processor, the processor performs steps of: 1) establishing a set of rules according to a minimum sensing channel width, a minimum sensing channel gap, a maximum distribution width and lengths of the sections of sensing channels; and 2) determining respective widths of the sections of sensing channels by utilizing a programming process according to the set of rules.

According to another embodiment of the present invention, a touch panel is provided. The touch panel includes a plurality of electrodes and a plurality of sensing channels, each includes at least one section. The plurality of the sensing electrodes are connected to a plurality of sensors for the touch panel via the plurality of sensing channels. A target electrode of the electrodes is connected to a target sensor for the sensors via a target sensing channel of the sensing channels. The target sensing channel includes N sections, where N is an integer greater than 1. The $(i+1)^{th}$ section of the N sections is closer to the target electrode than the $i^{th}$ section, where i is an integral index ranging between 1 and $(N-1)$. A width of the $i^{th}$ section is smaller than or equal to that of the $(i+1)^{th}$ section.

The above and other aspects of the invention will become better understood with regard to the following detailed

DETAILED DESCRIPTION OF THE INVENTION

Figure 1:
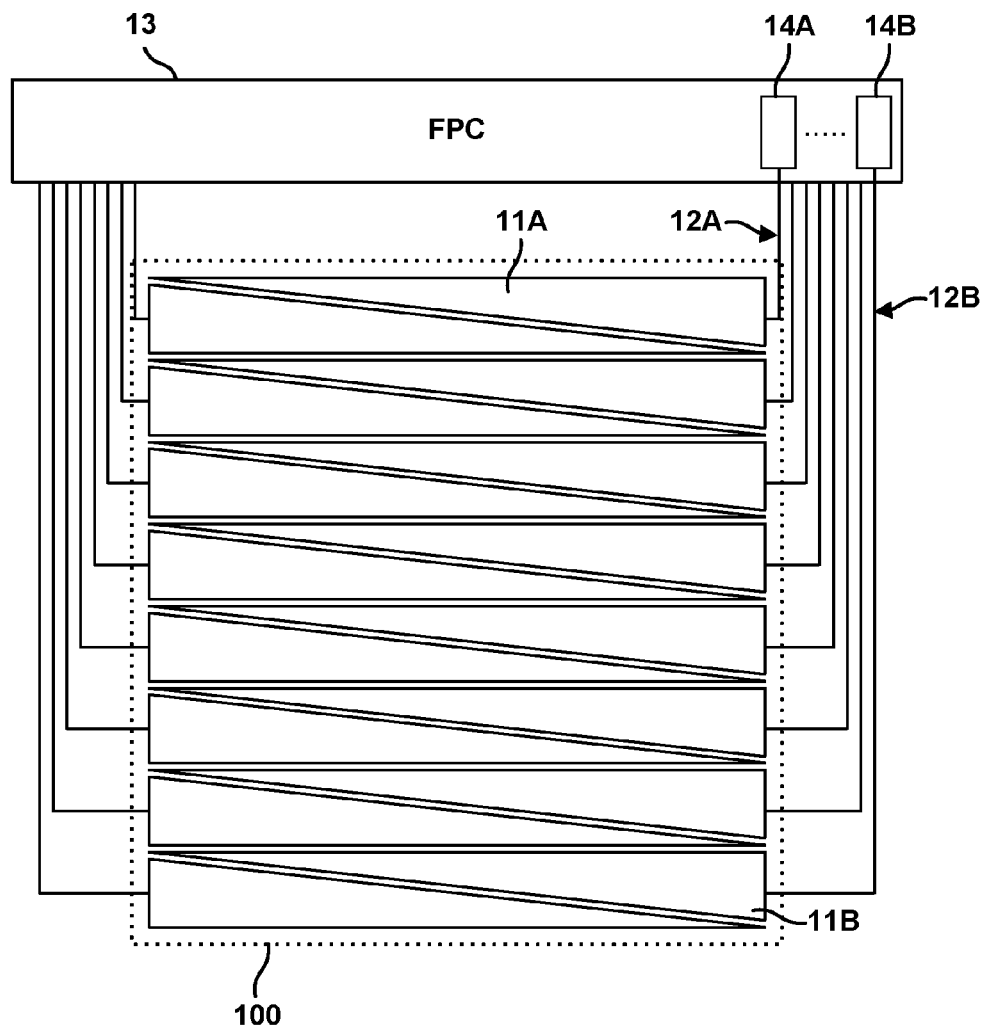
FIG. 1 is a diagram of a configuration of electrodes/sensing channels of a conventional self-capacitive touch panel.
Figure 2:
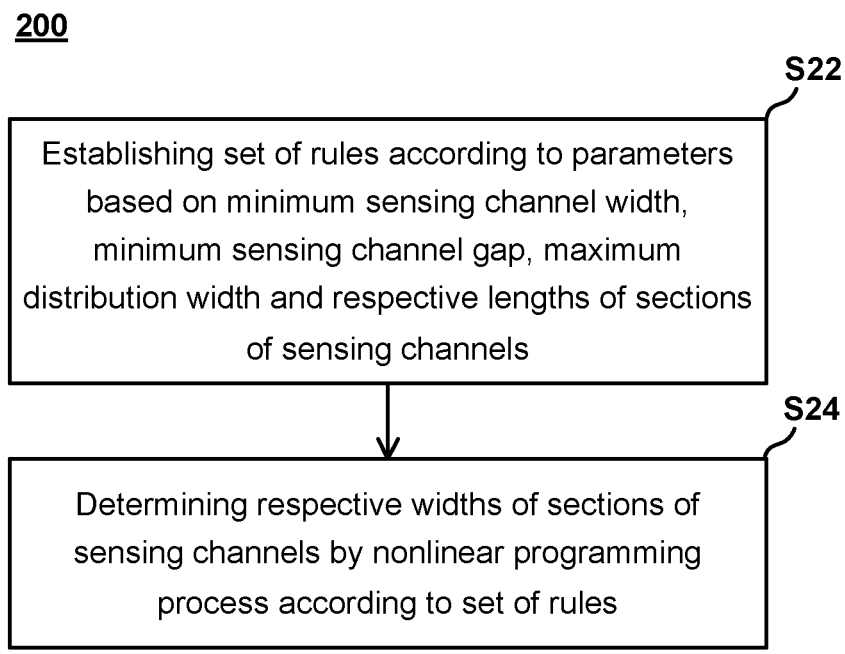
FIG. 2 is a flowchart of a method for designing a pattern of sensing channels according to an embodiment of the present invention.

A method for designing a pattern of sensing channels is provided according to an embodiment of the present invention. FIG. 2 shows a flowchart of a design process 200 of the method. The method is applied to a touch panel including a plurality of electrodes and a plurality of sensing channels, each includes at least one section. The electrodes are connected to a plurality of sensors for the touch panel via the sensing channels. In step S22, according to a minimum sensing channel width, a minimum sensing channel gap, a maximum distribution width, and lengths of the sections of sensing channels, a set of rules is established. In step S24, according to the set of rules, a programming process, such as a nonlinear programming process is utilized to determine respective widths of the sections of sensing channels. Details for implementing the design process 200 in FIG. 2 are given below with reference to an exemplary configuration of electrodes/sensing channels in FIG. 3(A).

Figure 3A:
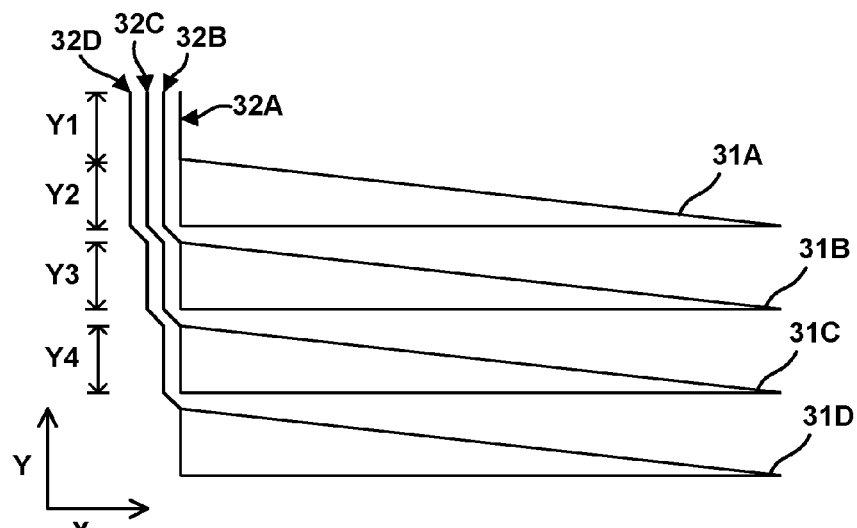
FIG. 3(A) is an example for illustrating a configuration of electrodes/sensing channels according to the concept of the present invention.
Figure 3B:
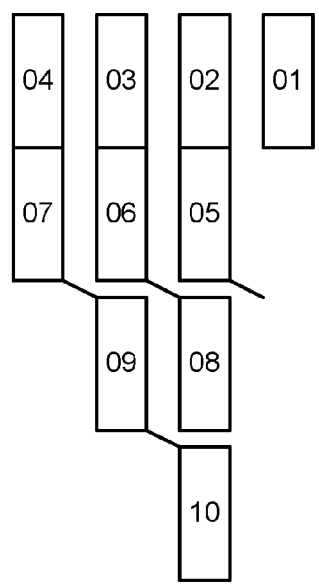
FIG. 3(B) is a schematic diagram of sections of the sensing channels in FIG. 3(A).

As shown in FIG. 3(A), a sensing channel 32A connects an electrode 31A to a corresponding sensor, a sensing channel 32B connects an electrode 31B to a corresponding sensor, a sensing channel 32C connects an electrode 31C to a corresponding sensor, and a sensing channel 32D connects an electrode 31D to a corresponding sensor. Also refer to FIG. 3(B) showing a schematic diagram of individual sections of the sensing channels in FIG. 3(A). Omitting slanted sections that are non-parallel to the Y-direction, the sensing channel 32A to 32D may be respectively regarded as one or multiple Y-direction sections. The sensing channel 32A includes one section (01) having a length falling within a range Y1. The sensing channel 32B includes two sections (02 and 05) having lengths falling within ranges Y1 and Y2. The sensing channel 32C includes three sections (03, 06 and 08) having lengths falling within ranges Y1, Y2 and Y3. The sensing channel 32D includes four sections (04, 07, 09 and 10) having lengths falling within ranges Y1, Y2, Y3, and Y4.

Assume that the sensing channel widths of the sections 01 to 10 are w1 to w10, respectively, and the lengths of the ranges Y1 to Y4 are L1 to L4, respectively. A resistance value $R_A$ of the sensing channel 32A, a resistance value $R_B$ of the sensing channel 32B, a resistance value $R_C$ of the sensing channel 32C, and a resistance value $R_D$ of the sensing channel 32D are listed as follows:

$$R_A = \rho \times \frac{L1}{w1} \quad (1)$$

$$R_B = \rho \times \left(\frac{L1}{w1} + \frac{L2}{w5}\right) \quad (2)$$

$$R_C = \rho \times \left(\frac{L1}{w3} + \frac{L2}{w6} + \frac{L3}{w8}\right) \quad (3)$$

$$R_D = \rho \times \left(\frac{L1}{w4} + \frac{L2}{w7} + \frac{L3}{w9} + \frac{L4}{w10}\right) \quad (4)$$

In the above equations, p represents the sheet resistance of a material of the sensing channels. In practice, the lengths L1 to L4 of the ranges Y1 to Y4 are associated with shapes of the electrodes, and are thus known in advance. In an embodiment of the present invention, before performing the design process 200, the widths w1 to w10 of the sensing channels are unknown. However, various manufacturing processes of touch panels specify a minimum width $W_{min}$ (i.e., respective lower limit of the widths w1 to w10) of the sensing channels and a minimum gap $G_{min}$ between two adjacent channels. Further, bound by an exterior design of the touch panel, a maximum width $W_{max}$ of the sensing channels distributed on the X-direction is also known information.

In the example in FIG. 3(B), the sensing channel widths w1 to w10 are required to satisfy all of the rules below:

$$\begin{cases} w1 + w2 + w3 + w4 + 4 \times G_{min} \leq W_{max} \\ w5 + w6 + w7 + 4 \times G_{min} \leq W_{max} \\ w8 + w9 + 3 \times G_{min} \leq W_{max} \\ w10 + 2 \times G_{min} \leq W_{max} \\ w1 \geq W_{min} \\ w2 \geq W_{min} \\ w3 \geq W_{min} \\ w4 \geq W_{min} \\ w5 \geq W_{min} \\ w6 \geq W_{min} \\ w7 \geq W_{min} \\ w8 \geq W_{min} \\ w9 \geq W_{min} \\ w10 \geq W_{min} \end{cases} \quad (5)$$

Establishing the above equations is equivalent to establishing the set of rules in step S22.

In step S24, respective widths of the plurality of sections of sensing channels are determined by utilizing a programming process according to the set of rules. In practice, the programming process is not limited to a particular algorithm. For example, the programming process may adopt a direct seeking method, a deepest descending method, a Newton type method, a conjugate direction method or a Newton approximation method to obtain a solution satisfying the rules. It should be noted that, details for obtaining the solution of the programming process are known to those skilled in the art, and shall be omitted herein.

In one embodiment, the programming process in step S24 is targeted at minimizing an average resistance difference of the sensing channels 32A to 32D, i.e., minimizing an average difference of $R_A$ to $R_D$. For example, the target of the programming process may be regarded as identifying a minimum value of function $f_1$ below:

$$f_1(w1,w2,w3,w4,w5,w6,w7,w8,w9,w10) = (R_A - R_B)^2 + (R_A - R_C)^2 + (R_A - R_D)^2 + (R_B - R_C)^2 + (R_B - R_D)^2 + (R_C - R_D)^2 \quad (6)$$

According to equations (1) to (4), the resistance values $R_A$ to $R_D$ in equation (6) may be substituted and represented by parameters $\rho$, L1 to L4, and w1 to w10. In addition to w1 to w10, other parameters are known. Therefore, the result of the programming process identifies the sensing channel widths w1 to w10 that satisfy the rules of equation (5) and minimize of the function $f_1$. When the sensing channels 32A to 32D are later designed according to the determined sensing channel widths w1 to w10, the sensing channels 32A to 32D may be given substantially the same resistance values. Thus, materials of higher unit resistance values, such as ITO, may also be utilized as the sensing channels in the touch panel, and form substantially the same resistance values with respect to different sensors. In one embodiment of the present invention, the electrodes and sensing channels are both made of ITO. Such approach of adopting one single material greatly reduces manufacturing complications and costs.

In another embodiment of the present invention, the programming process in step S24 limits the sensing channel widths w1 to w10 within a predetermined range, and is targeted at minimizing the average resistance value of the sensing channels 32A to 32D. For example, assuming that the minimum sensing channel $W_{min}$ is 0.03 mm, the sensing channel widths w1 to w10 are limited within 0.03 mm to 0.05 mm in the programming process. The programming process aims at identifying the minimum value of function f2 below:

$$f_2(w1, w2, w3, w4, w5, w6, w7, w8, w9, w10) = \quad (7)$$
$$\frac{1}{4} \times (R_A + R_B + R_C + R_D) =$$
$$\frac{\rho}{4} \times \left( \frac{L1}{w1} + \frac{L1}{w1} + \frac{L2}{w5} + \frac{L1}{w3} + \frac{L2}{w6} + \frac{L3}{w8} + \frac{L1}{w4} + \frac{L2}{w7} + \frac{L3}{w9} + \frac{L4}{w10} \right)$$

In practice, given a limited range of the sensing channel widths w1 to w10, the obtained result of the programming process targeting at minimizing function f2 is quite close to the obtained result of the programming process targeting at minimizing function f1. While targeting at minimizing function f2, the programming process requires lower computation complexity and a shorter period. As is well-known by people skilled in the art, the scope of the present invention is not limited to minimizing function f1 or f2 as the target of the programming process; functions that render sensing channels to have substantially equal resistance values can all be applied. The computation complexity of the programming process may correspondingly increase as the number of sensing channels becomes larger. However, the fundamental concept for a larger number of sensing channels and a higher computation complexity is consistent with that of the foregoing embodiments. Further, the slant sections non-parallel to the Y-direction that are previously omitted may also be considered for the computation.

It can be understood by one person having ordinary skill in the art that, the electrode pattern of the touch panel suitable for the concept of the present invention is not limited to the right triangles shown in FIG. 3(A). For example, the planar contours of the electrodes may also be rhombuses, rectangles, or other asymmetric polygons. Further, the scope of the present invention is not limited to the routing layout of the sensing channels shown in FIG. 3(A). For example, the number of sections included in the sensing channels may be larger or smaller. It should be noted that, the application concept of the present invention is not limited to the sensing channels in the touch panel, and may also be applied for designing a pattern of sensing channels in a mutual-capacitive touch panel.

According to another embodiment of the present invention, a non-transitory computer-readable storage medium is provided. The storage medium stores a program code readable and executable by a processor. The program code is for designing a plurality of sections of sensing channels in a touch panel. The touch panel further includes a plurality of electrodes. The electrodes are connected to a plurality of sensors for the touch panel. When the program code is executed by the processor, the processor performs steps of: 1) establishing a set of rules according to a minimum sensing channel width, a minimum sensing channel gap, a maximum distribution width and lengths of the sections of sensing channels; and 2) determining respective widths of the sections of sensing channels by utilizing a programming process according to the set of rules.

In practice, the computer-readable storage medium may be any type of non-transitory storage medium that stores a command readable and executable by a processor. The non-transitory medium includes electronic, magnetic and optical storage devices. For example, the non-transitory computer-readable storage medium includes: ROM, RAM and other electronic storage devices, CD-ROM, DVD and other optical storage devices, and magnetic tapes, floppy disks, hard disks and other magnetic storage devices. The processor commands may realize the present invention through various programming languages.

Further, operation details (e.g., several options for the target of the programming process) in the description associated with the design process 200 are applicable to the above computer-readable storage medium, and shall be omitted herein.

The sensing channels that are planned through the design process 200 or the above non-transitory computer-readable storage medium usually feature a characteristic that, the sensing channel gets wider as getting closer to the electrodes. More specifically, when the sensing channel connected to the same electrode includes multiple sections, the widths of the sections usually satisfy the relationship of: w10≥w9≥w7≥w4, w8≥w6≥w3, w5≥w2. Therefore, according to another embodiment of the present invention, a touch panel is provided. The touch panel includes a plurality of electrodes, and a plurality of sensing channels, each includes at least one section. The plurality of the electrodes are connected to a plurality of sensors via the plurality of sensing channels. A target electrode of the electrodes is connected to a target sensor of the sensors via a target sensing channel of the sensing channels. The target sensing channel includes N sections, where N is an integer greater than 1. The $(i+1)^{th}$ section of the N sections is closer to the target electrode than the $i^{th}$ section, where i is an integral index ranging between 1 and (N−1). The width of the $i^{th}$ section is smaller than that of the $(i+1)^{th}$ section.

A method for designing a pattern of sensing channels is disclosed as above. Through a programming process, the method of the present invention is capable of minimizing an average resistance difference of multiple sections of the sensing channels; that is, the multiple sections of sensing channels having different lengths can be designed to have substantially the same resistance values. Based on such feature of the present invention, a material such ITO having a higher unit resistance value can also be adopted as a material for the sensing channels, thereby reducing production costs of the touch panel. As ITO is substantially transparent, outer edges of the touch panel need not be provided with a frame for covering the sensing channels.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for designing sensing channels, applied to a touch panel comprising a plurality of electrodes and a plurality of sensing channels, each comprising at least one section, the electrodes connected to a plurality of sensors for the touch panel via the sensing channels, the method comprising:
    establishing a set of rules according to a minimum sensing channel width, a minimum sensing channel gap, a maximum distribution width and respective lengths of the sections of sensing channels; and
    determining respective widths of the sections of sensing channels with a programming process according to the set of rules.

2. The method according to claim 1, wherein the programming process minimizes an average resistance difference of the sections of sensing channels.

3. The method according to claim 1, wherein the programming process limits the respective widths of the sections of sensing channels within a predetermined range, and minimizes an average resistance value of the sections of sensing channels.

4. The method according to claim 1, wherein the sections of sensing channels are made of indium tin oxide (ITO).

5. The method according to claim 1, wherein the programming process adopts a direct seeking method, a deepest descending method, a Newton type method, a conjugate direction method or a Newton approximation method.

6. A non-transitory computer-readable storage medium, storing a program code readable and executable by a processor, the program code for designing a plurality of sections of sensing channels in a touch panel, the touch panel further comprising a plurality of electrodes, the electrodes connected to a plurality of sensors for the touch panel via the sections of sensing channels; when the program code is executed by the processor, the processor executing steps of:
    establishing a set of rules according to a minimum sensing channel width, a minimum sensing channel gap, a maximum distribution width and respective lengths of the sections of sensing channels; and
    determining respective widths of the sections of sensing channels with a programming process according to the set of rules.

7. The non-transitory computer-readable storage medium according to claim 6, wherein the programming process minimizes an average resistance difference of the sections of sensing channels.

8. The non-transitory computer-readable storage medium according to claim 6, wherein the programming process limits the respective widths of the sections of sensing channels within a predetermined range, and minimizes an average resistance value of the sections of sensing channels.

9. The non-transitory computer-readable storage medium according to claim 6, wherein the sections of sensing channels are made of ITO.

10. The non-transitory computer-readable storage medium according to claim 6, wherein the programming process adopts a direct seeking method, a deepest descending method, a Newton type method, a conjugate direction method or a Newton approximation method.

11. A touch panel, comprising:
    a plurality of electrodes; and
    a plurality of sensing channels, each comprising at least one section, the plurality of the electrodes connected to a plurality of sensors via the plurality of sensing channels, a target electrode of the electrodes connected to a target sensor of the sensors via a target sensing channel of the sensing channels; the target sensing channel comprising N sections, N being an integer greater than 1; the $(i+1)^{th}$ section of the N sections being closer to the target electrode than the $i^{th}$ section, a width of the $i^{th}$ section being smaller than or equal to that of the $(i+1)^{th}$ section, i being an integral index ranging between 1 and $(N-1)$.

12. The touch panel according to claim 11, wherein a minimum sensing channel width, a minimum sensing channel gap, a maximum distribution width and respective lengths of the sections of sensing channels satisfy a set of rules, and an average resistance difference of the sections of sensing channels is minimized according to the set of rules.

13. The touch panel according to claim 12, wherein the average resistance difference is minimized by a programming process that adopts a direct seeking method, a deepest descending method, a Newton type method, a conjugate direction method or a Newton approximation method.

* * * * *